United States Patent
Sun et al.

[11] Patent Number: 6,123,528
[45] Date of Patent: Sep. 26, 2000

[54] REED DISCHARGE VALVE FOR SCROLL COMPRESSORS

[75] Inventors: Zili Sun, Arkadelphia, Ark.; Stephen L. Shoulders, Baldwinsville, N.Y.; Cole Morgan, Lonoke, Ark.

[73] Assignee: Scroll Technologies, Arkadelphia, Ark.

[21] Appl. No.: 09/056,066

[22] Filed: Apr. 6, 1998

[51] Int. Cl.[7] .................................................... F01C 1/02
[52] U.S. Cl. .......................... 418/55.1; 137/527; 251/284; 251/303
[58] Field of Search ................. 418/55.1; 137/527; 251/284, 303

[56] References Cited

U.S. PATENT DOCUMENTS

| | | |
|---|---|---|
| 4,494,564 | 1/1985 | Lukacz . |
| 4,607,661 | 8/1986 | Wessels et al. ...................... 137/527 X |
| 5,088,905 | 2/1992 | Beagle .................................... 418/55.1 |
| 5,346,375 | 9/1994 | Akiyama et al. . |
| 5,397,348 | 3/1995 | Campbell et al. ................... 137/527 X |
| 5,496,160 | 3/1996 | Richardson, Jr. et al. . |
| 5,674,058 | 10/1997 | Matsuda et al. . |
| 5,693,090 | 12/1997 | Unsworth et al. ................... 137/527 X |

FOREIGN PATENT DOCUMENTS

| | | |
|---|---|---|
| 0478378A2 | of 1991 | European Pat. Off. . |
| 109159 | of 1998 | Japan . |
| 702223 | of 1954 | United Kingdom . |

OTHER PUBLICATIONS

Abstracts and Figure of JP010009159.

*Primary Examiner*—Hoang Nguyen
*Attorney, Agent, or Firm*—Carlson, Gaskey & Olds

[57] ABSTRACT

A unique valve assembly is disclosed which has particular utility in scroll compressors. The valve assembly includes a relatively thin valve plate formed of reed valve steel. The valve plate is less than 0.05 inch, and is elastically deformable upon application of fluid pressure. Thus, the pressure fluid in a chamber formed above the valve plate deforms the valve plate to conform to the valve seat. In embodiments a clip holds the valve plate on the valve seat. The clip provides a stop surface for the valve seat, and is also formed of thin resilient steel. Thus, when the valve plate is driven to its open position, the steel valve plate contacts the steel clip such that there is a spring back effect in response to rapid movement of the valve plate to its open position.

17 Claims, 5 Drawing Sheets

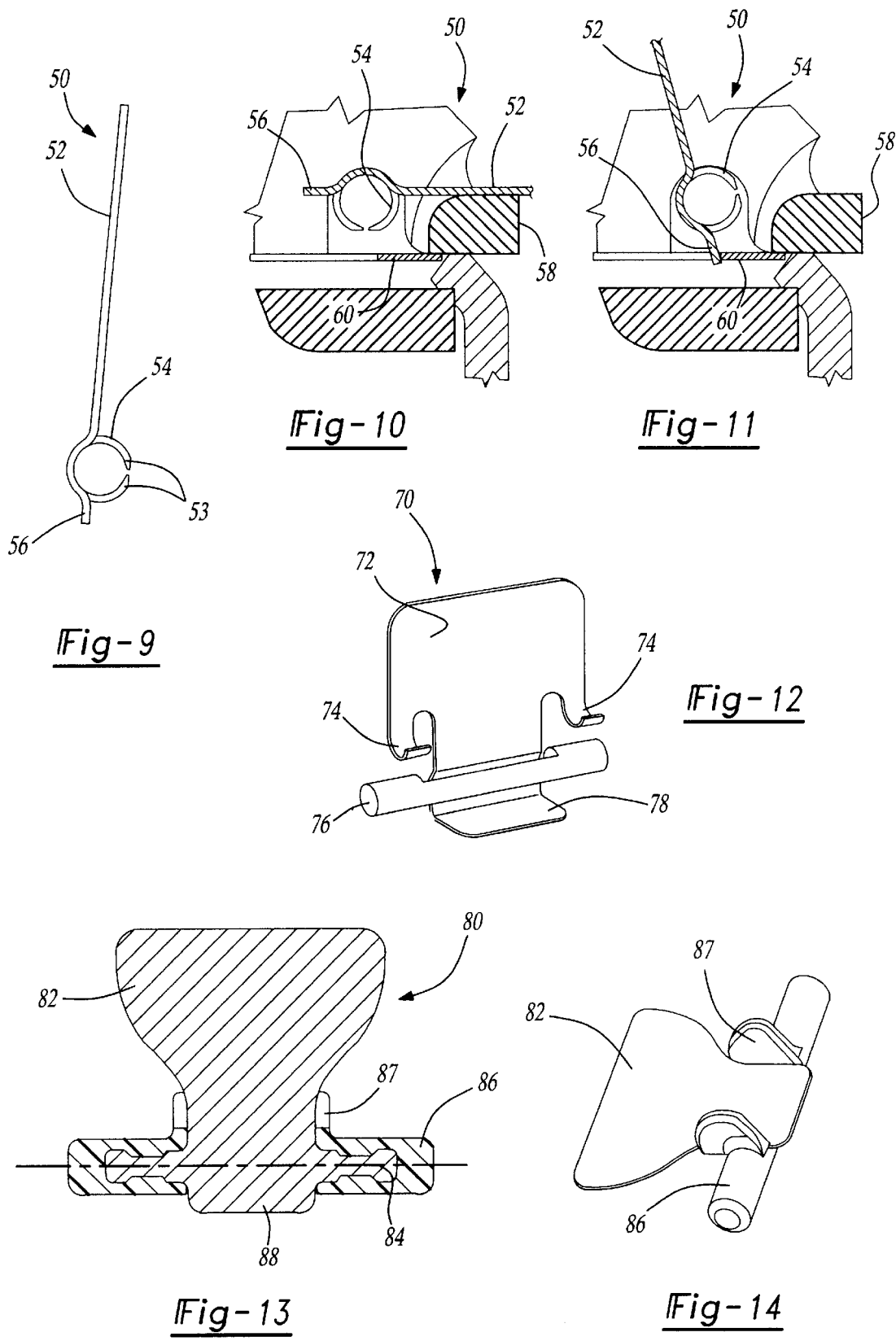

REED DISCHARGE VALVE FOR SCROLL COMPRESSORS

BACKGROUND OF THE INVENTION

This invention relates to a unique discharge valve for scroll compressors which provides a better seal, and is better adapted to withstand the operation of a scroll compressor than the prior art valves.

Scroll compressors have become widely utilized in refrigerant compression applications. Since scroll compressors have greater efficiency than many other types of compressors, they are attractive for many applications. However, scroll compressors also present many design challenges.

Scroll compressors typically utilize two interfitting scroll members. Each member has a base with a generally spiral wrap extending from the base. The wraps interfit to define compression chambers. One of the wraps orbits relative to the other to cause the compression chambers to change in volume, thus compressing entrapped refrigerant.

One challenge with scroll compressor operation occurs at shutdown. At shutdown of a scroll compressor, the volume of compressed gas trapped between the wraps and the relatively large volume of compressed gas contained within the discharge plenum, discharge lines and condenser can drive the orbiting scroll in a reverse direction. This reverse rotation may continue until pressures on the high pressure side of the system equalize with pressures on the low side of the system. Such prolonged reverse rotation is undesirable.

To address this challenge, scroll compressors have been provided with a discharge valve. The discharge valve is typically not a spring biased valve, but instead is free to pivot between an open and closed position. The discharge valve is open when the compressor is compressing refrigerant, but quickly moves to a closed position upon shutdown. The valve thus blocks flow of compressed refrigerant back into the compression chambers upon shutdown. This limits the amount of trapped gas communicating with the compression chambers, and greatly reduces the occurrence of reverse rotation.

The prior art valves have used large valve plates which are cast or otherwise formed to have a relatively thick configuration. These members are rigid, and do not have an easily deformed face which can adapt to the face of the valve seat and thus do not provide an ideal seal. Moreover, the structure provided for the prior art valve has included a stop between the rigid valve plate and a rigid separator plate, which is mounted directly below the valve. Upon start up of the compressor, the valve plate is quickly driven to its stop position, since there is no spring bias. Thus, the prior art rigid and relatively thick valve plate is driven to a position where it hits the rigid separator plate. This occurrence may sometimes cause damage to the valve plate, and thus is undesirable.

This type prior art valve 10 is shown in FIG. 1. As shown, a valve seat 11 includes a resilient clip 12 which snaps over a rear portion of the valve seat 11. A relatively thick cast valve plate 13 includes a sealing portion 14, and ears 15 at each side. A stop portion 16 is formed rearwardly of the ears 15. Clip 12 holds the valve plate 13 onto the valve seat 11. The closure portion 14 of the valve plate 13 selectively closes the fluid opening 17.

As shown in FIG. 2, when the compressor is shut down, the valve plate 13 is in the position shown in phantom at 14c. At this position, the port 17 is closed. Due to the rigid valve plate, a tight seal is not necessarily maintained around the entire valve plate. That is, the valve plate cannot easily adapt to the shape of the valve seat.

At start up, the valve plate 13 is driven rearwardly to the position shown in solid line. At this position, the stop portion 16 contacts and abuts a top surface 18 of a separator plate. When driven to this position, there are undesirably high impact forces between the stop portion 16 and the separator plate 18. These forces could cause damage to the valve plate 13.

SUMMARY OF THE INVENTION

In a disclosed embodiment of this invention, a scroll compressor is provided with a relatively thin reed valve plate on its discharge port. The valve plate is formed to have a generally equal thickness throughout its entire area. Further, the valve is formed of reed steel, and is elastically deformable by application of fluid pressure such that it can adapt to the configuration of the valve seat. Thus, the inventive valve provides a better seal than the prior art.

The valve is held onto its valve seat by a spring steel clip. The inventive clip and valve plate function differently than the prior art clip and valve plate. The valve plate moves to a stop position where a stop portion of the valve plate abuts a rear portion of the clip. When the compressor is started the resilient valve plate moves quickly to its stop position at which it abuts the spring steel clip. There is thus some resilient spring back from the spring steel to spring steel contact. The spring back reduces the likelihood of damage to the valve when compared to the prior art.

In other aspects of this invention, valves are disclosed wherein the area covering the discharge port is formed of the relatively thin steel valve plate material, but other portions may have a non-uniform cross-section. In one embodiment, the roller ears which pivot within the valve holder are rolled from the thin material such that they are not of a constant thickness.

In other embodiments, there may be plastic positioned on the thin valve plate to form the roller ears. In some embodiments, the plastic also forms shoulders for providing a valve stop. These plastic ears provide wear resistance, and facilitate guidance and proper operation of the valve. In addition, in some embodiments the valve may abut the top of the separator plate, rather than the clip. In one embodiment the mounting clip is eliminated and the valve snaps onto the housing.

These and other features of the present invention can be best understood from the following specification and drawings, the following of which is a brief description.

BRIEF DESCRIPTION OF THE DRAWINGS

FIG. 9 shows a second embodiment valve plate.

FIG. 10 is a view of the FIG. 9 valve plate in the closed position.

FIG. 11 is a partial view of the FIG. 9 valve plate moved to the open position.

FIG. 12 shows a third embodiment valve plate.

FIG. 13 is a cross-sectional view through a fourth embodiment valve plate.

FIG. 14 shows the FIG. 13 valve plate in perspective view.

DETAILED DESCRIPTION OF A PREFERRED EMBODIMENT

Figures 1, 2:
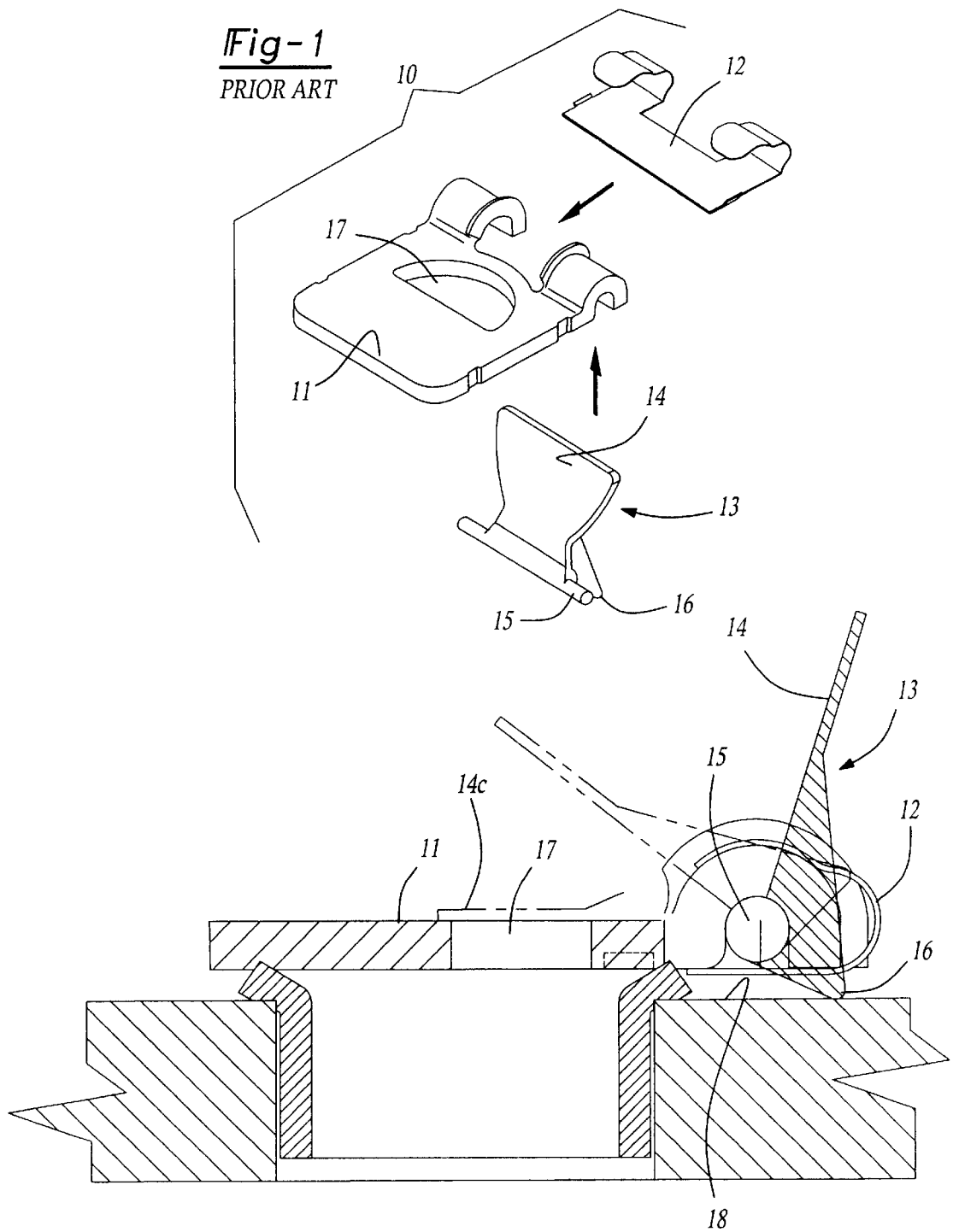
FIG. 1 is an exploded view of the prior art valve.
FIG. 2 is a cross-sectional view showing the operation of the prior art valve.
Figure 3:
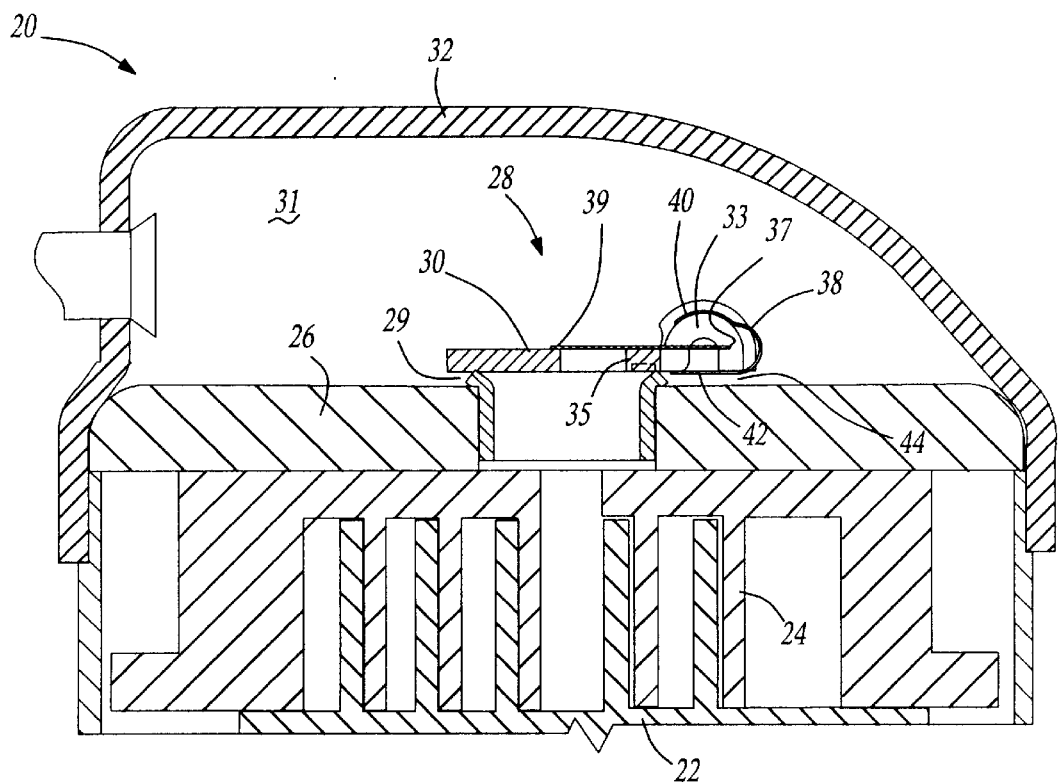
FIG. 3 is a cross-sectional view of a scroll compressor incorporating the inventive valve.

An inventive valve plate is illustrated in FIG. 3. As shown, an orbiting scroll 22 interfits within a fixed, or non-orbiting, scroll 24 to define compression chambers. A separator plate 26 is mounted above the fixed scroll 24. A discharge valve assembly 28 is mounted above the separator plate 26. A tube 29 is positioned within a discharge port in separator plate 26. A valve seat 30, which may be somewhat similar to the valve seat of the prior art, is welded to the top of tube 29. A discharge pressure chamber 31 is formed between the separator plate 26 and a housing top 32.

Figure 4:
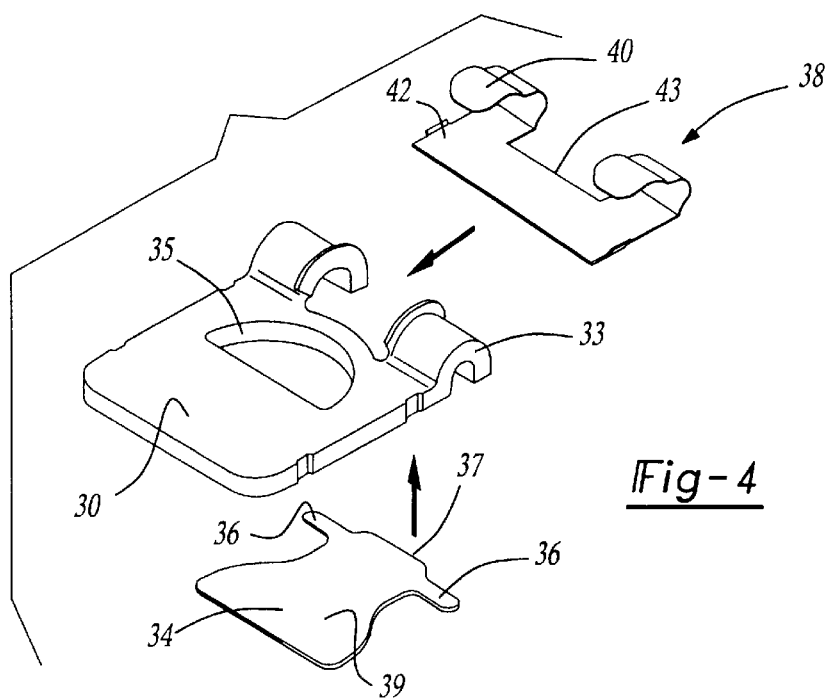
FIG. 4 is an exploded view of the inventive valve.

As shown in FIG. 4, U-shaped portions 33 of valve seat 30 form an opening to mount a valve plate 39. Valve plate 39 selectively closes fluid opening 35 in the valve seat 30. Valve plate 39 includes a forward portion 34 for enclosing the opening 35, and ears 36 received within the opening defined by U-shaped portions 33. A clip 38 snaps onto U-shaped portions 33 through its own U-shaped portion 40 to enclose the portions 33 and capture ears 36. The clip 38 includes a forward portion 42 and a stop portion 43.

Figure 5:
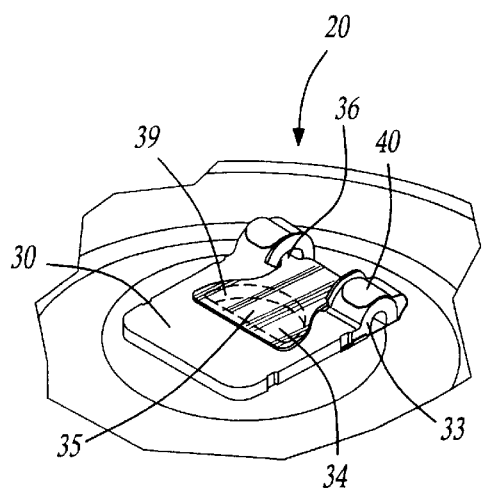
FIG. 5 shows the inventive valve in a closed position.
Figure 6:
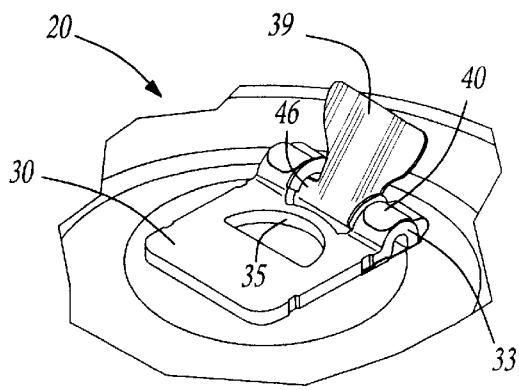
FIG. 6 shows the inventive valve in a stop position.

FIG. 5 shows valve plate 39 in the closed position. As shown in FIG. 6, when driven to the open position, the valve plate 39 allows flow through the port 35.

Figure 7:
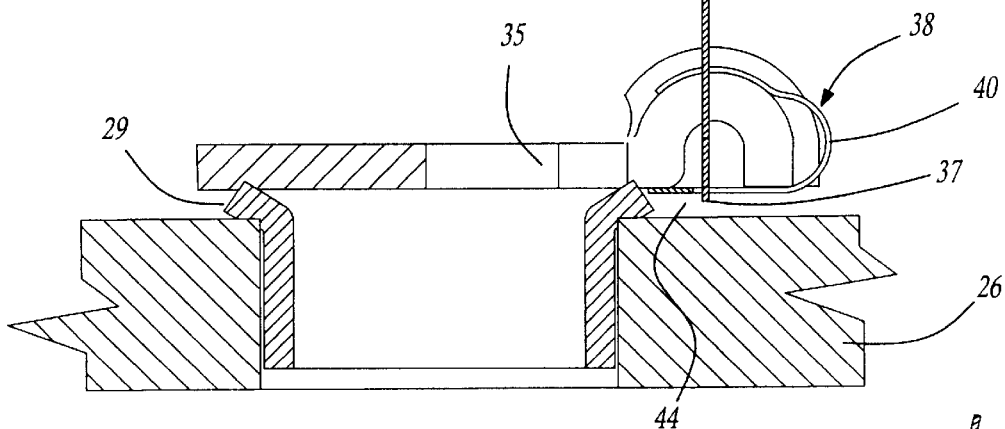
FIG. 7 is a cross-sectional view showing the inventive valve in an intermediate open position.
Figure 8:
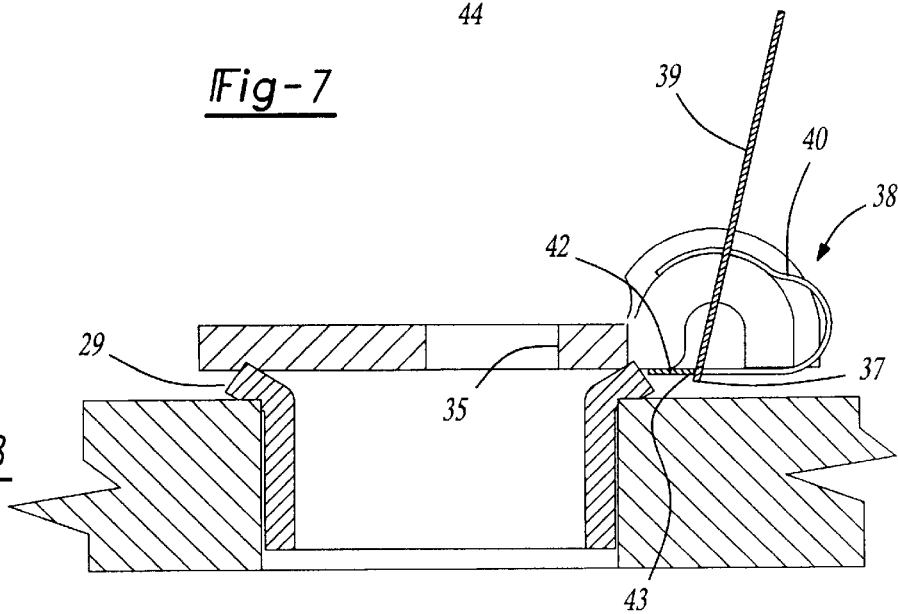
FIG. 8 shows the inventive valve in the stop position.

The operation of the valve will now be explained with reference to FIGS. 3, 7 and 8.

As shown in FIG. 3, when the compressor is shut down, the valve plate 39 closes port 35 on the valve seat 30. Gas from chamber 31 cannot flow back into the compression chambers defined between the scroll members 22 and 24. In addition, pressure built up in chamber 31 forces the relatively thin valve plate 39 onto the valve seat 30. The relatively thin valve plate 39 deforms elastically such that it provides a very good seal closing the port 35. Further, since valve plate 39 is flat and of a single thickness it is less likely to have any deviation in its shape that could detract from the seal. The present invention thus may tend to prevent the reverse rotation at shutdown of a scroll compressor that might occur due to leakage between the valve and valve seat.

When the compressor is again started, fluid is compressed between the orbiting and fixed scrolls 22 and 24 and flows upwardly through port 35. The pressure fluid drives the valve plate 39 to its open position, and through the position shown in FIG. 7. Eventually, the valve plate 39 moves to the stop position such as shown in FIG. 8. In the stop position stop portion 37 of valve plate 39 abuts stop portion 43 of the clip 40. Upon start-up of the compressor, and development of pressure within the compression chambers, the movement from the FIG. 3 position to the FIG. 8 position can happen very rapidly. This is particularly true since there is no spring bias on the valve plate. When the movement is rapid, the thin steel valve plate 39 has portion 37 being driven into the spring steel stop 43. There is thus a spring back effect, rather than the prior art stop of two rigid members being driven into each other. This feature dramatically reduces the impact forces on the valve and reduces the likelihood of damage to the valve.

When the compressor is shut down, fluid trying to pass from chamber 31 back through the tube 29 will act on the rear of valve plate 39 and force it to its closed FIG. 3 position. In this position, due to the flexibility and flatness of the valve plate 39, a very good seal is provided minimizing leakage of the gas around the valve plate and through the tube 29. Due to the very thin valve plate, the mass of the valve plate is small. Thus, the response of the valve plate to move to its closed position is very quick. The mass of the valve also contributes to an additional reduction in impact forces on the valve plate at startup. With a heavier valve plate, such as the prior art valve plate, there was a longer response time, and correspondingly increased leakage before closure. Thus, the occurrence of shut down reverse rotation and the resultant noise is minimized. In addition, since the valve is not spring biased to its closed position, it is quickly opened upon start-up of the compressor.

Valve plate 39 has generally one thickness throughout its entire area. It is preferably stamped from steel reed valve material. Further, the valve plate preferably has a thickness of less than 0.05 inch. Most preferably, the valve plate has a thickness of 0.015 inch.

A second embodiment valve plate 50 is illustrated in FIG. 9. As in the first embodiment, portion 52 of the valve plate which covers the valve seat opening is formed of a relatively thin steel. In this way, the benefits mentioned above of the valve plate easily deforming to conform to the seat will still occur, as will the other benefits with regard to the lightweight valve plate. Preferably, the ears are formed by curling edges 53 into a circle 54 to form the pivoting portions. As with the other embodiment, a stop 56 positioned is rearwardly of the pivoting portions.

As shown in FIG. 10, the valve is mounted to close an opening 58. As can be seen, the portion 52 covering opening 58 has a constant cross-sectional thickness, which may be of the same thickness as the above embodiment. A clip 60 holds the valve 50 on the valve housing.

As shown in FIG. 11, when the valve 50 moves to its open position, the stop 56 abuts the clip 60 to prevent further movement as in the prior embodiment.

FIG. 12 shows another embodiment 70 wherein the portion 72 which covers the opening 58 is a thin constant cross-sectional thickness portion. Clip portions 74 abut a top surface of the valve seat when the valve is in the closed position to maintain the valve on the valve seat. When the valve is moved to its open position, portion 78 abuts the top of the separator plate to stop movement of the valve 70. This embodiment may be utilized without any holding clip.

FIG. 13 shows another embodiment 80, again having the thin portion 82 for closing the valve opening. The ears 84 are surrounded by molded plastic portions 86 to provide a more controlled pivoting movement, and better wear resistance to abrasion or damage to the valve. Side portions 87 are also molded at that time to provide a stop for the valve during its movement. The plastic portions may be snapped onto the metal rather than being molded. A stop 88 is again positioned rearwardly and will abut a portion of the clip.

Figure 15:
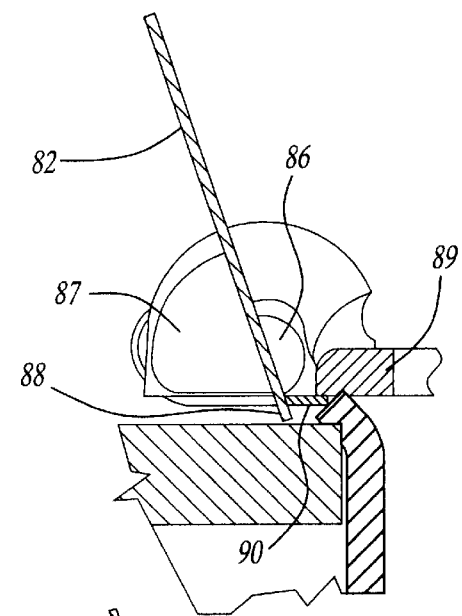
FIG. 15 shows the FIG. 13 valve plate in the open position.

As shown in FIG. 15, stop 88 has abutted a portion of the clip 90 to prevent further movement. The opening 89 through the valve is now open.

Figure 16:
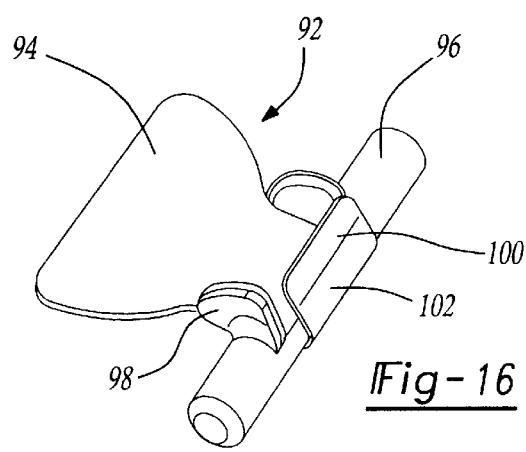
FIG. 16 shows a fifth embodiment valve plate.

As shown in FIG. 16, another embodiment 92 includes a thin closure portion 94 as in the above embodiments, with molded ears 96 as in the previous embodiment and shoulders 98 to provide stops. The stop 100 is formed with a flat surface 102.

Figure 17:
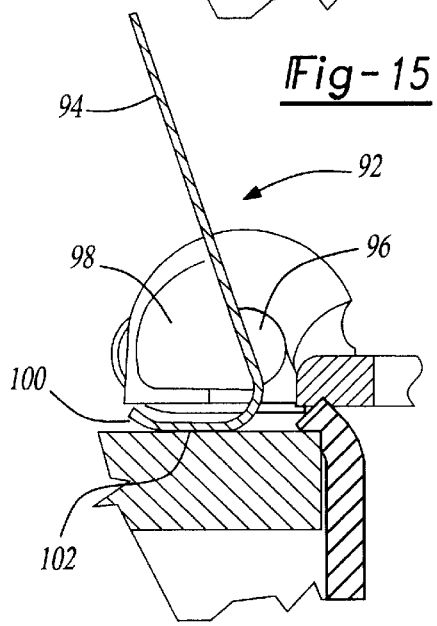
FIG. 17 shows the embodiment of FIG. 16 in the open position.

As shown in FIG. 17, embodiment 92 is pivoted to its open position wherein the stop 100, and it particular planar portion 102, abuts the top of the separator plate.

Figure 18:
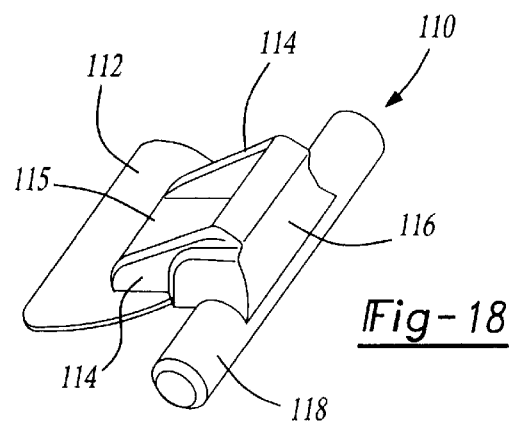
FIG. 18 shows a sixth embodiment valve plate.

As shown in FIG. 18, another embodiment 110 has flat portion 112, ears 114, a flat planar portion 115, and a rear stop portion 116. The ears 118 are again covered with molded plastic.

Figure 19:
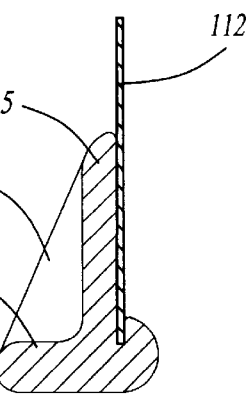
FIG. 19 is a cross-sectional view through the FIG. 18 valve plate.

As shown in the cross-section of FIG. 19, the thin portion 122 is provided with the molded portions 114, 115 and 116. Portion 116 provides a stop and portions 114 and 115 provide the better structural rigidity to the valve plate portion 112, and further provide a stop.

Figure 20:
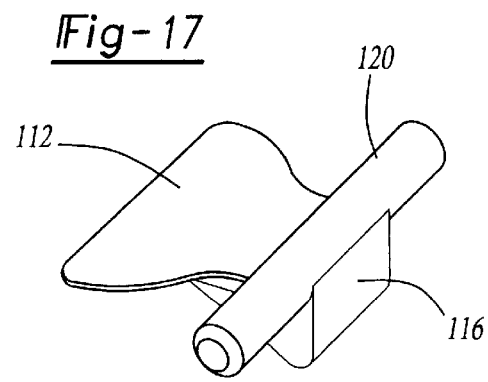
FIG. 20 shows a bottom view of the FIG. 18 valve plate.

As shown in FIG. 20, the portion 112 of the valve which covers the opening is generally the thin metal member such that it may deform to conform to the shape of the opening.

Three main features are disclosed to the several valve concepts in this Application. The bulk of the valve embodiments include a portion which covers the opening through the discharge plate, wherein the portion is formed of a constant cross-sectional thickness thin steel valve. Preferably, the portion is a thickness of less than 0.05 inch.

In a second main feature, the valve is provided with a clip to hold the valve on its housing. The valve has a stop that abuts a stop surface on the clip.

In a third main feature, the valves are provided with molded ears which are the pivoting points within the housing. The valve is again provided with a thin metal closure portion along with the molded plastic ears.

The valve functions as a bi-stable valve. That is, a valve that will be opened or closed dependent on whether the compressor is running. If the compressor is running, the valve will open, and if the compressor shuts down, the valve will close. Pressure fluctuations will tend not to cause the valve to close, as the resistance to pivoting movement is low with the inventive valve embodiments.

Although a preferred embodiment of this invention has been disclosed, a worker of ordinary skill in the art would recognize that certain modifications would come within the scope of this invention. For that reason, the following claims should be studied to determine the true scope and content of this invention.

What is claimed is:

1. A scroll compressor comprising:
   a first scroll member including a base and a scroll wrap extending from said base;
   a second scroll including a base and a scroll wrap extending from said base, said scroll wraps of said first and second scrolls interfitting to define a plurality of compression chambers;
   a discharge port extending through a housing member; and
   a valve assembly pivoting between open and closed positions for selectively closing said discharge port, said valve assembly including a relatively thin valve plate which pivots between opened and closed positions dependent on the gas flow direction within said discharge port, said valve plate having a generally constant thickness throughout at least an area covering said discharge port, and said thickness being less than 0.05 inch.

2. A scroll compressor as recited in claim 1, wherein said valve plate selectively closes an opening in a valve seat, said valve seat having structure for confining said valve plate to movement relative to said port, and a clip member secured on said valve seat to secure said valve plate, a stop portion of said valve plate contacting a stop portion of said clip to provide a stop against further movement of said valve plate.

3. A scroll compressor as recited in claim 2, wherein said clip member is formed of thin spring steel.

4. A scroll compressor as recited in claim 2, wherein said valve plate has laterally spaced ears received in openings in said valve seat, and said stop portion of said valve plate being spaced on an opposed side of said ears from a portion of said valve plate which closes said discharge port.

5. A scroll compressor as recited in claim 4, wherein said clip includes two side portions received on portions of said valve seat to capture said valve plate ears on said valve seat, and said stop portion of said clip is positioned intermediate said two side portions.

6. A scroll compressor as recited in claim 1, wherein said valve plate is not spring biased toward said closed position.

7. A scroll compressor as recited in claim 1, wherein said valve is self-supporting on said housing.

8. A scroll compressor as recited in claim 1, wherein said valve has ears received within guidance structure, said ears being surrounded by plastic.

9. A discharge valve assembly for a compressor comprising:
   a thin valve plate;
   a valve seat and an opening extending through said valve seat, said valve plate having a portion which is selectively moved to close said opening, said valve plate being received for movement between a closed position and an open position, and a clip for attaching sliding onto said valve seat and said valve plate to said valve seat, said valve plate having a stop portion and said clip having a stop portion, and said valve plate stop portion abutting said clip stop portion to define a stop against further movement of said valve plate, and to define said open position.

10. A discharge valve assembly for a compressor as recited in claim 9, wherein said valve plate having ears received on said valve seat for pivoting movement, said ears being surrounded by plastic.

11. A discharge valve assembly as recited in claim 10, wherein said thin valve plate includes a portion which covers said opening, said portion being formed of a constant cross-sectional thickness.

12. A discharge valve assembly as recited in claim 11, wherein said constant cross-sectional thickness is less than 0.05 inch.

13. A discharge valve assembly for a compressor comprising:
   a thin valve plate having a portion which is to cover an opening in a valve seat, said portion being formed of a cross-sectional thickness which is constant throughout an area of said valve which covers said valve plate, said valve plate being formed with ears which define pivoting structure for said valve plate relative to said valve seat, said ears being surrounded by plastic;
   said opening extending through said valve seat, said valve plate having a portion which is selectively moved to close said opening, said valve plate being received for pivoting movement between said closed position and an opening position relative to said valve seat.

14. A discharge valve assembly as recited in claim 13, wherein shoulders are formed laterally inwardly of said ears, said shoulders also being formed of a plastic.

15. A discharge valve assembly as recited in claim 13, wherein a stop is formed on an opposed side of said ear from said portion.

16. A discharge valve assembly as recited in claim 15, wherein said stop abuts a housing plate positioned beneath said valve plate.

17. A discharge valve assembly as recited in claim 13, wherein said ears are formed to include a portion of said thin valve plate having said constant cross-section along a pivot axis of said ears.

* * * * *